US012337623B2

(12) United States Patent
Corghi (10) Patent No.: US 12,337,623 B2
(45) Date of Patent: Jun. 24, 2025

(54) TYRE CHANGING APPARATUS

(71) Applicant: NEXION S.p.A., Correggio (IT)

(72) Inventor: Giulio Corghi, Correggio (IT)

(73) Assignee: NEXION S.p.A., Correggio (IT)

( * ) Notice: Subject to any disclaimer, the term of this patent is extended or adjusted under 35 U.S.C. 154(b) by 276 days.

(21) Appl. No.: 16/844,287

(22) Filed: Apr. 9, 2020

(65) Prior Publication Data

US 2020/0324590 A1 Oct. 15, 2020

(30) Foreign Application Priority Data

Apr. 8, 2020 (EP) ..................................... 20168707

(51) Int. Cl.
*B60C 25/138* (2006.01)
*B60C 25/05* (2006.01)

(52) U.S. Cl.
CPC ........ *B60C 25/138* (2013.01); *B60C 25/0527* (2013.01); *B60C 25/0545* (2013.01); *B60C 25/0554* (2013.01)

(58) Field of Classification Search
CPC ............ B60C 25/0512; B60C 25/0593; B60C 25/059; B60C 25/05; B60C 25/138; B60C 25/0554; B60C 25/0545; B60C 25/0527
USPC ....................... 157/1.2, 1.17, 1.24, 1.28, 1.22
See application file for complete search history.

(56) References Cited

U.S. PATENT DOCUMENTS

| | | | | |
|---|---|---|---|---|
| 8,051,889 B2* | 11/2011 | Ferrari | ................ | B60C 25/0593 157/1.24 |
| 8,770,254 B1* | 7/2014 | Hanneken | ........... | B60C 25/0548 157/1.24 |
| 8,985,178 B1* | 3/2015 | Vaninger | ................ | B60C 25/056 157/1.1 |
| 9,370,975 B2 | 6/2016 | Kirstätter | | |

(Continued)

FOREIGN PATENT DOCUMENTS

| | | | |
|---|---|---|---|
| EP | 1157860 A2 | 11/2001 | |
| EP | 1584495 A2 | 10/2005 | |

(Continued)

OTHER PUBLICATIONS

Italy Search Report dated Nov. 5, 2019 for Application No. 102019000005728.

*Primary Examiner* — Katina N. Henson (74) *Attorney, Agent, or Firm* — The Dobrusin Law Firm, P.C.

(57) ABSTRACT

A tyre changing apparatus (1) comprises: a frame (10); a supporting element (11) for supporting a wheel (2) rotatably about an axis of rotation (A); an arm (12) movably connected to the frame (10) to be moved by an actuator (5B, 5B') along a direction of movement (B) parallel to the axis of rotation (A); a bead breaker tool (13) connected to the arm (12) to move between an activated position, where it is in contact with the tyre (3), and a deactivated position, where it is spaced from the tyre (3); a control unit (14). The bead breaker tool (13) includes a mounting element (13A) and a bead breaker disc (13B) which rotates freely relative to the (Continued)

mounting element (13A) and comprises a sensor (131), configured to generate a contact signal (132) representing a rotation of the bead breaker disc (13B) relative to the mounting element (13A); the control unit (14) is connected to the sensor (131) to receive the contact signal (132).

18 Claims, 7 Drawing Sheets

(56) References Cited

U.S. PATENT DOCUMENTS

| | | | |
|---|---|---|---|
| 2012/0199293 A1* | 8/2012 | Corghi | B60C 25/056 |
| | | | 29/894.31 |
| 2016/0001617 A1* | 1/2016 | Corghi | B60C 25/059 |
| | | | 29/894.31 |
| 2018/0356784 A1* | 12/2018 | Sotgiu | G05B 19/048 |

FOREIGN PATENT DOCUMENTS

| | | | |
|---|---|---|---|
| EP | 1157860 | B1 | 7/2007 |
| EP | 2110270 | A1 | 10/2009 |
| EP | 2042351 | B1 | 3/2010 |
| EP | 2484541 | B1 | 8/2012 |
| EP | 2962876 | A1 | 1/2016 |
| EP | 2962876 | B1 | 12/2016 |
| EP | 2042351 | A1 | 4/2019 |
| IT | 201700028239 | A1 | 9/2018 |

* cited by examiner

TYRE CHANGING APPARATUS

This invention relates to a tyre demounting apparatus.

In the technical field of tyre changing (in particular, demounting) apparatuses, before a tyre can be demounted from the respective wheel rim, the tyre bead must be "broken" from the respective rim. This operation allows starting to detach the tyre from the rim. To perform this operation, a bead breaker tool is used. The most commonly used type of bead breaker tool comprises a bead breaker disc which, by rotating freely relative to a mounting element, progressively detaches the tyre bead from the rim without damaging the sidewall of the tyre.

During bead breaking operations, it is very important for the bead breaker tool being used to be positioned precisely. In particular, it is essential to position the bead breaker tool precisely along a movement direction parallel to the axis of rotation of the wheel. In effect, the risk of incorrectly positioning the bead breaker tool is that the tyre will be damaged if the tool presses too hard on the tyre, or that the bead will not be properly loosened if the pressure of the bead breaker tool on the tyre is insufficient.

Speeding up machine setup operations, i.e. positioning the parts used for demounting, is also a common need.

In some prior art solutions in the field of tyre changing apparatuses, a sensorized pin is used to detect the effective presence of the wheel by coming into contact with the wheel flange or with the sidewall of the tyre. This solution, described for example in document EP1584495A2, has the disadvantage that the sensorized element which has to come into contact with the wheel raises the probability of damage, resulting in the need for repairs. Moreover, activating and operating the sensorized pin is relatively complicated.

In other prior art solutions, positioning is preceded by a step of scanning in which a laser device measures the size of the wheel and the bead breaker tool is then positioned based on that measurement. In this case, positioning takes longer.

In patent document EP2484541B1, in the name of this Applicant, the feed speed of the bead breaker tool is monitored by a control unit. The control unit is configured to measure speed changes, which indicate that an obstacle has been reached. In response to these measurements, the control unit determines the position of the tyre sidewall along the movement direction.

Other solutions involving measurement of the movement of the bead breaker tool towards the wheel are described, for example, in patent documents EP1157860B1, EP2962876B1, US937097582, EP2110270A1 and EP2042351B1.

These solutions, too, however, have the disadvantage of not being very precise and robust when hydraulic actuators, whose sensitivity to obstacles is much more limited, are used. These solutions are not very precise, therefore, and may cause substantial damage to the tyre.

This disclosure has for an aim to provide a tyre changing apparatus and a method for demounting a tyre from a wheel rim to overcome the abovementioned disadvantages of the prior art.

This aim is fully achieved by the tyre changing apparatus and method of this disclosure as characterized in the appended claims.

The term "tyre changing apparatus" used in this disclosure denotes an apparatus adapted to mount and demount a tyre to and from a respective rim.

According to one aspect of it, this disclosure provides an apparatus for demounting a tyre from a corresponding wheel rim. The apparatus comprises a frame.

The apparatus comprises a supporting element. The supporting element is rotatable about an axis of rotation. In an embodiment, the axis of rotation is vertical. In an embodiment, the axis of rotation is horizontal. The supporting element is configured to support the wheel. The supporting element is configured to support the wheel rotatably about the axis of rotation.

In an embodiment, the supporting element is movable along a direction of adjustment. The direction of adjustment may be perpendicular to the axis of rotation or parallel to the axis of rotation.

The apparatus comprises a bead breaker tool to perform bead breaking (loosening the tyre bead from the flange on the rim).

The apparatus comprises an actuator for moving the bead breaker tool and the supporting element (that is, the wheel fixed to the supporting element) towards and away from each other).

In one embodiment, the actuator is a hydraulic actuator. In other embodiments, the actuator is a pneumatic or electric actuator.

The apparatus also comprises an arm for supporting the bead breaker tool; the bead breaker tool is connected to the arm. In an embodiment, the arm is movably connected to the frame. In an embodiment, the arm is movably connected to the frame to be moved by the actuator along a direction of movement. In an embodiment, the direction of movement is parallel to the axis of rotation.

In an embodiment, the arm is movable with respect to the supporting element to allow relative movement between the arm and the supporting element.

To obtain the relative movement between the arm and the supporting element, both the supporting element and the bead breaker tool may be movable or one may be movable and the other stationary.

For example, in a possible embodiment, the supporting element might be movable relative to the frame, to move towards or away from the bead breaker tool, and the arm might be connected to the frame in such a way that it is fixed (that is, stationary) relative to the direction of movement.

In the embodiment where the bead breaker tool is movable towards and away from the wheel, the bead breaker tool is connected to the arm to be moved along the direction of movement. In an embodiment, the bead breaker tool is connected to the arm to be moved between an activated position and a deactivated position. At the activated position, the bead breaker tool is in contact with the tyre. At the deactivated position, the bead breaker tool is spaced from the tyre.

In the embodiment where the bead breaker tool is movable (relative to the frame) towards and away from the wheel, the arm is movable and the bead breaker tool is movable as one with the arm; in addition or alternatively, the bead breaker tool might be movable relative to the arm it is connected to in order to move towards and away from the supporting element.

In an embodiment, the supporting element is movable along the direction of movement until it comes into contact with the bead breaker tool. In this embodiment, the bead breaker tool reaches the activated position (in contact with the wheel) thanks to the movement of the wheel resulting from the movement of the supporting element along the direction of movement.

In an embodiment, the bead breaker tool includes a mounting element. The bead breaker tool includes a bead breaker disc. The bead breaker disc is freely rotatable relative to the mounting element.

In an embodiment, the actuator is connected to the arm and moves it preferably along the direction of movement. In an embodiment, the actuator is associated with the bead breaker tool and moves it preferably along the direction of movement.

The apparatus comprises a control unit.

In an embodiment, the bead breaker tool comprises a sensor. The sensor is configured to generate a contact signal. In an embodiment, the contact signal represents relative rotation between the mounting element and the bead breaker disc.

In an embodiment, the control unit is connected to the sensor. The control unit is connected to the sensor to receive the contact signal.

Thus, since rotation of the bead breaker disc relative to the mounting element indicates contact between the bead breaker tool and the tyre sidewall, the control unit knows (is capable of detecting) that contact has occurred and it can process the information received.

In an embodiment, the control unit is connected to the actuator and drives it. The control unit is configured to generate stop signals. In an embodiment, the stop signals depend on the contact signal received from the sensor. The control unit is configured to generate stop signals to stop the actuator. That way, the control unit is able to position the bead breaker tool very precisely, irrespective of the type of actuator used. In effect, the means by which contact is detected is rotation, which is not affected by the type of actuator used.

In an embodiment, the control unit has access to a position signal. By position signal is meant a signal representing a position of the bead breaker tool. In an embodiment, the position signal represents a position of the bead breaker tool along the direction of movement. In an embodiment, the position signal represents a position of the bead breaker tool in a working plane perpendicular to the direction of movement. In other words, the control unit is configured to identify the position of the bead breaker tool relative to the frame at any moment in time.

In an embodiment, the position signal represents a position of the supporting element relative to the frame. In an embodiment, the position signal represents a relative position between the bead breaker tool and the supporting element.

In an embodiment, the control unit is configured to store a value of the position signal. In an embodiment, the control unit is configured to store a value of the position signal as a function of the contact signal. In other words, the control unit is configured to compare the value of the position signal with a reference value. The control unit is configured to store a value of the position signal at a contact instant, when a value of the contact signal is greater or less than the reference value.

This allows having a trace of the position of the tyre sidewall which may also be used in subsequent operating steps.

In an embodiment, the bead breaker tool is movable in the working plane.

In an embodiment, the bead breaker tool is movable in the working plane between an interference position and a non-interference position. At the interference position, the bead breaker tool is aligned with the tyre on the wheel along the direction of movement. At the non-interference position, the bead breaker tool is out of alignment with the tyre on the wheel along the direction of movement. In other words, at the interference position, moving along the direction of movement would cause the bead breaker tool to come into contact with the tyre. At the non-interference position, on the other hand, moving along the direction of movement does not cause the bead breaker tool to come into contact with the tyre on the wheel.

In an embodiment, the apparatus comprises an additional actuator. The additional actuator is configured to rotate and/or translate the bead breaker tool, preferably in the working plane.

This affords a high level of flexibility for moving and positioning the bead breaker tool.

In an embodiment, the control unit is configured to receive configuration data. In an embodiment, the configuration data represent a diameter of the wheel. In an embodiment, the configuration data are captured automatically or entered manually. In an embodiment, the control unit is configured to generate drive signals. In an embodiment, the drive signals are determined from the configuration data. In an embodiment, the bead breaker tool is moved to the interference position as a function of the drive signals.

In an embodiment, the bead breaker tool is movable in the working plane along a direction of activation (that is, along an activation axis).

In one embodiment, the direction of activation is incident upon the axis of rotation of the supporting element (that is, the activation axis intersects the axis of rotation of the supporting element).

In another embodiment, the direction (axis) of activation might not be incident upon the axis of rotation of the supporting element; the direction (axis) of activation might, for example, be tangent to a circle whose centre lies on the axis of rotation and whose radius is equal to an adjustment radius.

In an embodiment, the apparatus comprises a synchronizing system. The synchronizing system is configured to synchronize the movement of the supporting element along the direction of adjustment with the movement of the bead breaker tool along the direction of activation according to a specific kinematic law of motion.

That way, the bead breaker tool can reach the non-interference position more quickly.

In an embodiment, the sensor is a magnetic sensor. In an embodiment, the sensor is a magnetic induction sensor and/or a capacitive sensor and/or an ultrasonic sensor and/or an optical sensor. In an embodiment, the sensor comprises a first magnet. The first magnet is disposed on the mounting element. In an embodiment, the sensor comprises a second magnet. The second magnet is disposed on the bead breaker disc of the bead breaker tool. In an embodiment, the sensor is configured to detect a change in the electromagnetic field in response to the relative rotation between the mounting element and the bead breaker disc.

In an embodiment, the actuator is a hydraulic cylinder.

In an embodiment, the supporting element is movable relative to the frame translationally along a direction of adjustment.

In an embodiment, the apparatus comprises an additional arm. In an embodiment, the apparatus comprises an additional bead breaker tool. In an embodiment, the additional arm and/or the additional bead breaker tool are disposed along the direction of movement on a side of the wheel opposite to that where the bead breaker tool is disposed. It should be noted that the structural features described for the bead breaker tool also apply to the additional bead breaker tool. In effect, the additional bead breaker tool comprises a respective sensor and/or a respective mounting element and/or a respective bead breaker disc.

In an embodiment, the additional bead breaker tool is configured to generate a respective contact signal. In an embodiment, the contact signal of the additional bead breaker tool represents relative rotation between the respective mounting element and the additional bead breaker disc. In an embodiment, the control unit is connected to the sensor of the additional bead breaker tool to receive the respective contact signal.

In an embodiment, the control unit has access to an additional position signal, representing the position of the additional bead breaker tool along the direction of movement. The control unit is configured to store a value of the position signal as a function of the value of the additional contact signal.

The control unit is therefore configured to store the position signal of the bead breaker tool, representing a position of the bead breaker tool along the direction of movement (which may represent a position of a sidewall of the tyre) and to store the position signal of the additional bead breaker tool, representing a position of the additional bead breaker tool along the direction of movement (which may represent a position of the opposite sidewall of the tyre). That way, the control unit is configured to determine the height of the tyre.

According to one aspect of it, this disclosure provides a method for demounting a tyre from a corresponding wheel rim.

The method comprises a step of supporting the wheel on a supporting element. The method comprises a step of rotating the supporting element about an axis of rotation.

In an embodiment, the method comprises a step of moving an arm along a direction of movement parallel to the axis of rotation by means of an actuator. The direction of movement may be vertical, horizontal or it may have at least one vertical component.

In an embodiment, the method comprises a step of moving a bead breaker tool connected to the arm. In the step of moving, the bead breaker tool moves between an activated position, where it is in contact with the tyre, and a deactivated position, where it is spaced from the tyre.

In an embodiment, the method comprises a step of detecting a rotation. In the step of detecting a rotation, the relative rotation between a mounting element and a bead breaker disc of the bead breaker tool is detected. The step of detecting the rotation is performed by a sensor.

In an embodiment, the method comprises a step of generating a contact signal. In an embodiment, the contact signal represents relative rotation between the mounting element and the bead breaker disc of the bead breaker tool.

In an embodiment, the method comprises a step of receiving the contact signal in a control unit.

According to an aspect of this disclosure, the method comprises a step of generating stop signals. The stop signals are generated by the control unit. The stop signals are generated as a function of the contact signal.

In an embodiment, the method comprises a step of stopping. In the step of stopping, the step of moving the bead breaker tool is stopped as a function of the stop signals. In an embodiment, in the step of stopping, a movement of the supporting element is stopped as a function of the stop signals.

In an embodiment, in the step of stopping, the control unit compares the value of the contact signal with a reference value and, as a function of the comparison, generates the stop signals.

In an embodiment, the method comprises a step of accessing a position signal. The position signal represents a position of the bead breaker tool, preferably along the direction of movement. In the step of accessing a position signal, the control unit knows the position of the bead breaker tool at any instant in time.

In an embodiment, the method comprises a step of storing a value of the position signal. In an embodiment, the step of storing a value of the position signal is performed as a function of the contact signal received from the sensor.

In an embodiment, in the step of storing, the control unit compares the value of the contact signal with a reference value and, as a function of the comparison, stores the value of the position signal at the same time instant.

In an embodiment, the method comprises a step of moving the supporting element along a direction of adjustment. In an embodiment, the method comprises a step of translating the supporting element along a direction of adjustment.

In an embodiment, the method comprises a step of entering data. In the step of entering data, the control unit receives configuration data representing a diameter of the wheel (or other geometric features of the wheel).

In an embodiment, the method comprises a step of activating the bead breaker tool. In the step of activating, the bead breaker tool is moved in a working plane perpendicular to the direction of movement.

In the step of activating, the bead breaker tool is moved between an interference position, where the bead breaker tool is aligned with the tyre on the wheel along the direction of movement, and a non-interference position, where the bead breaker tool is out of alignment with the tyre on the wheel along the direction of movement.

In an embodiment, the method comprises a step of accessing an additional position signal. The additional position signal represents a position of an additional bead breaker tool along the direction of movement. The additional bead breaker tool is disposed along the direction of movement on an opposite side of the wheel with respect to the bead breaker tool.

In an embodiment, the method comprises a step of storing a value of the additional position signal. In an embodiment, the step of storing a value of the additional position signal is performed as a function of a respective contact signal received from a respective sensor of the additional bead breaker tool.

In an embodiment, the method comprises a step of calculating the distance along the direction of movement between the two sidewalls of the tyre, as a function of the value of the position signal and the value of the additional position signal.

In an embodiment, the method comprises both the step of moving the supporting element and the step of moving the bead breaker tool. In this embodiment, the method comprises a step of synchronizing, in which the movement of the supporting element and the movement of the bead breaker tool are synchronized by a synchronizing system. In an embodiment, the method comprises the step of moving only the supporting element along a direction of adjustment.

In an embodiment, the step of detecting the rotation is carried out by measuring a change in the electromagnetic field with a magnetic sensor.

In an embodiment, the step of detecting the rotation is carried out by measuring induction with an induction sensor.

These and other features will become more apparent from the following detailed description of a preferred, non-limiting embodiment, illustrated by way of example in the accompanying drawings, in which.

With reference to the accompanying drawings, the numeral 1 denotes an apparatus according to this disclosure for demounting a tyre 3 from a respective rim 4 of a wheel 2. The apparatus 1 comprises a frame 10. The frame 10 is configured to support the apparatus 1. The frame 10 comprises a first structure 101. The frame 10 comprises a second structure 102. In an embodiment, the first structure 101 extends along a direction of movement B. In an embodiment, the second structure 102 extends along a direction of adjustment R, perpendicular to the direction of movement B.

In an embodiment, the direction of movement B is parallel to the direction of the weight force. In an embodiment, the direction of movement B is perpendicular to the direction of the weight force.

The apparatus 1 comprises a supporting element 11. The supporting element 11 is configured to support the wheel 2. The supporting element 11 is rotatable about an axis of rotation A. In an embodiment, the axis of rotation A is parallel to the direction of movement B.

The supporting element 11 is configured to support the wheel 2 rotatably. In an embodiment, the rim is connected (that is, fixed) to the supporting element. The supporting element is therefore configured to set the wheel in rotation.

In an embodiment, the supporting element 11 is movable along the direction of adjustment R. In an embodiment, the supporting element 11 is movable translationally along the direction of adjustment R.

The supporting element comprises a chuck configured to clamp the wheel 2 in place during demounting operations.

In an embodiment, the supporting element 11 is movable (preferably translationally) along the direction of movement B.

In an embodiment, the apparatus comprises a first actuator 5A, configured to move the supporting element 11 along the direction of adjustment R and/or along the direction of movement B.

In an embodiment, the apparatus 1 comprises an arm 12. The arm 12 extends along a direction of activation T, included in a working plane P, perpendicular to the direction of movement B from a first end 12A to a second end 12B. The arm 12 is connected at its first end 12A to the first structure 101.

In an embodiment, the first structure 101 comprises a guide 101A. In an embodiment, the arm 12 is movable in the direction of movement B, preferably along the guide 101A. In an embodiment, the arm 12 is movable transitionally in the direction of movement B, preferably along the guide 101A. In an embodiment, the arm 12 is movable along the direction of activation T.

In an embodiment, the apparatus 1 comprises a second actuator 5B. The second actuator 5B is configured to move the arm 12 along the direction of movement B.

In an embodiment, the apparatus 1 comprises a bead breaker tool 13. The bead breaker tool 13 is connected to the arm 12. The bead breaker tool 13 is connected to the second end 12B of the arm 12.

In an embodiment, the first end 12A and the second end 12B of the arm 12 are movable relative to each other and the bead breaker tool is disposed on the second end 12B of the arm 12. In some embodiments, the arm 12 is connected to a carriage which is slidable along the direction of movement B on the guide 101A.

In an embodiment, the bead breaker tool 13 is movable along the direction of movement B. In an embodiment, the bead breaker tool 13 is movable translationally along the direction of movement B. In an embodiment, the bead breaker tool 13 is movable along the direction of activation T.

In an embodiment, the bead breaker tool 13 comprises a mounting element 13A. In an embodiment, the bead breaker tool 13 comprises a bead breaker disc 13B.

In an embodiment, the arm 12 is movable between a working position PL, where the bead breaker tool 13 is aligned with the wheel 2 along the direction of movement B, and a rest position PR, where the bead breaker tool 13 is out of alignment with the wheel 2 along the direction of movement B.

In an embodiment, the bead breaker tool 13 is movable between an interference position PI, where it is aligned with the wheel 2 along the direction of movement B, and a non-interference position PN, where it is out of alignment with the wheel 2 along the direction of movement B.

In other words, the bead breaker tool 13 is at the interference position PI when the arm 12 is at the working position PL, and the bead breaker tool 13 is at the non-interference position PN when the arm 12 is at the rest position PR.

In an embodiment, the bead breaker tool 13 is movable between an activated position PA, where it is in contact with the tyre 3, and a deactivated position PD, where it is spaced from the tyre 3 along the direction of movement.

In an embodiment, the bead breaker tool 13 is movable relative to the arm 12. In an embodiment, the bead breaker tool 13 is movable transationally relative to the arm 12 along the direction of activation T or along the direction of activation T or along the direction of movement B. In an embodiment, the bead breaker tool 13 oscillates relative to the arm 12. In an embodiment, the bead breaker tool 13 is rotatable relative to the arm 12 about its axis of rotation, which is parallel to the direction of movement B or to the direction of adjustment R or to the axis of rotation A or to the direction of activation T. In an embodiment, the bead breaker disc 13B of the bead breaker tool 13 rotates relative to the mounting element 13A about its axis, which is preferably inclined at an angle to the axis of rotation A.

In an embodiment, the direction of activation T passes through the axis of rotation A of the wheel 2 In an embodiment, the direction of activation T is tangent to a circle whose centre lies on the axis of rotation A and whose radius is equal to a radius of activation r.

In an embodiment, the arm is movable by rotation in such a way as to vary the radius of activation r.

In an embodiment, the direction of activation T and the direction of adjustment R are offset (inclined to each other) by an offset angle.

In an embodiment, the apparatus 1 comprises a synchronizing system. The synchronizing system is configured to allow moving the bead breaker tool 13 along the direction of activation T according to a (kinematic) law of motion dependent on the movement of the supporting element 11 along the direction of adjustment R. In the same way, the synchronizing system is configured to allow moving the supporting element 11 along the direction of adjustment T according to a (kinematic) law of motion dependent on the movement of the bead breaker tool 13 along the direction of activation T.

The apparatus comprises a control unit 14. The control unit is configured to control the first actuator 5A and/or the second actuator 5B. In an embodiment, the apparatus 1 comprises a user interface 14'.

Figure 1:
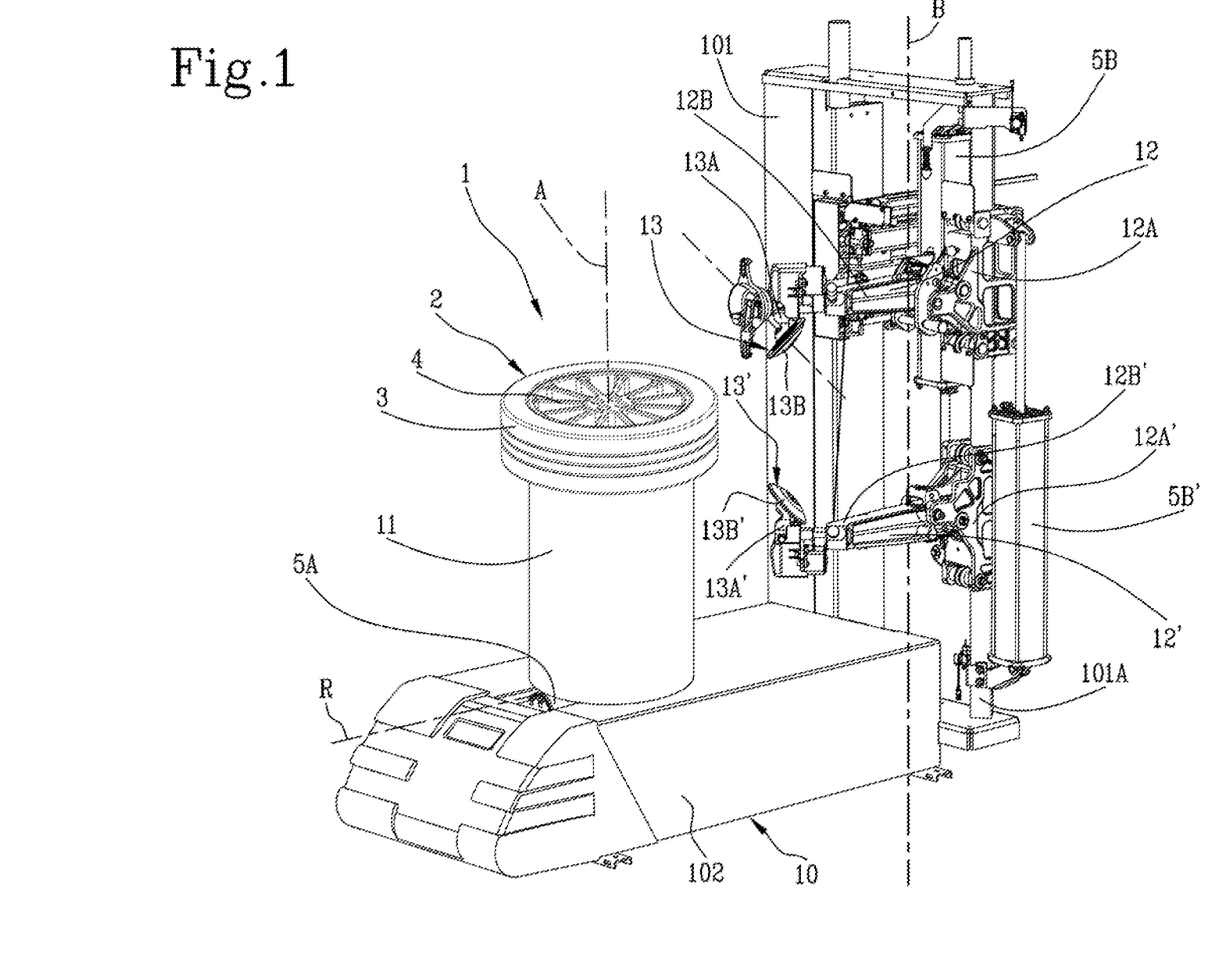
FIG. 1 illustrates an apparatus for demounting a tyre from a respective wheel rim.
Figure 2A:
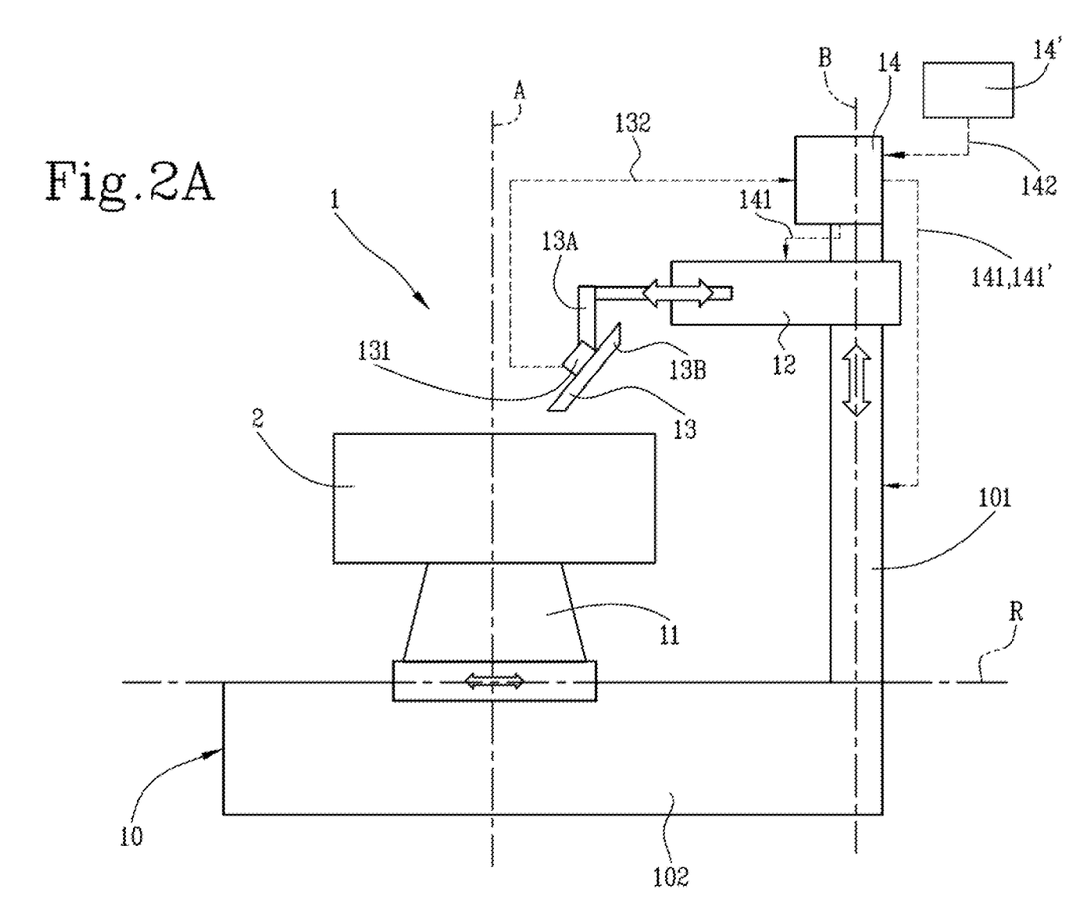
FIGS. 2A and 2B schematically illustrate a side view of a first and a second embodiment of the apparatus of FIG. 1, respectively.
Figure 2B:
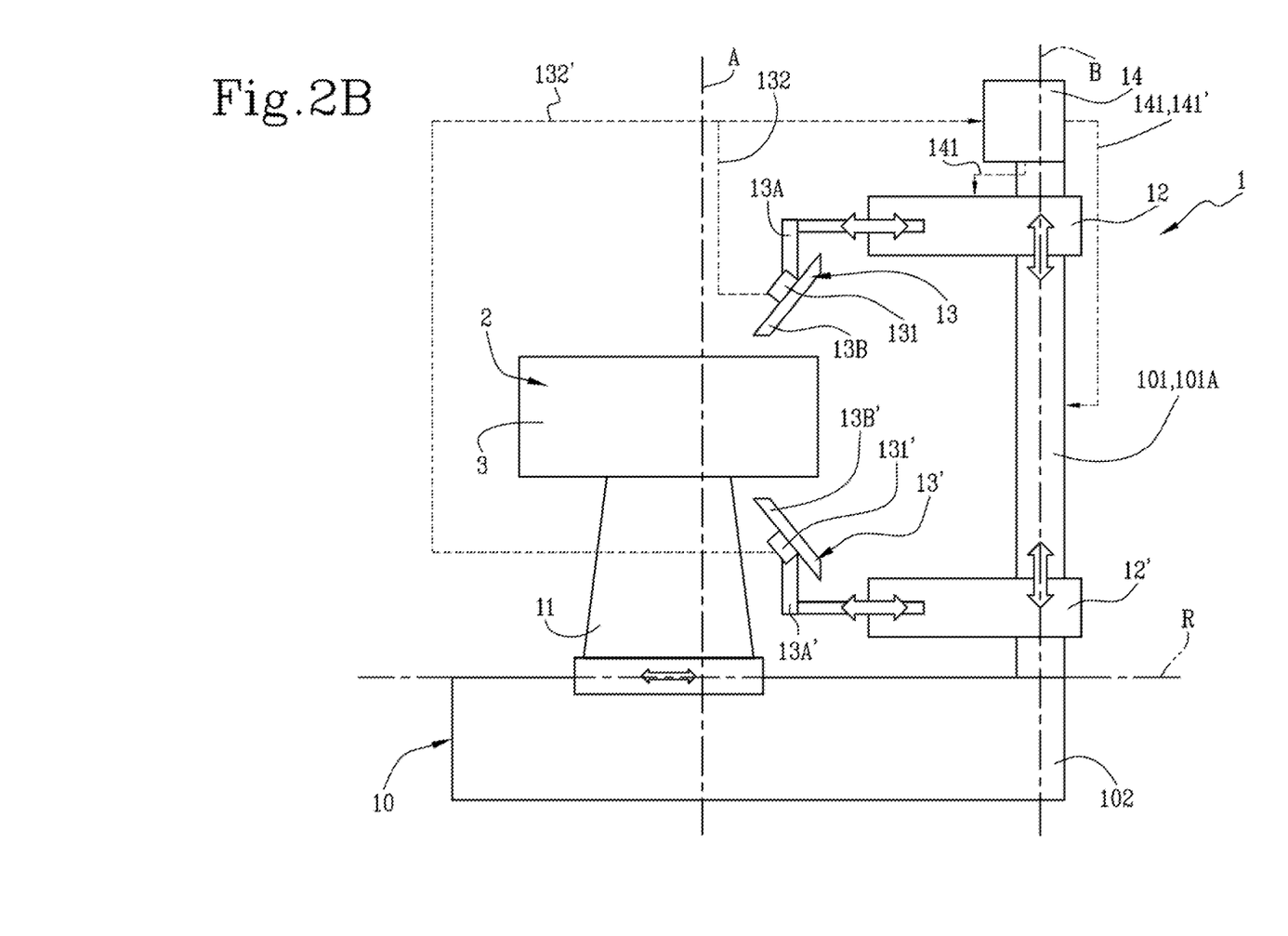
Figure 3:
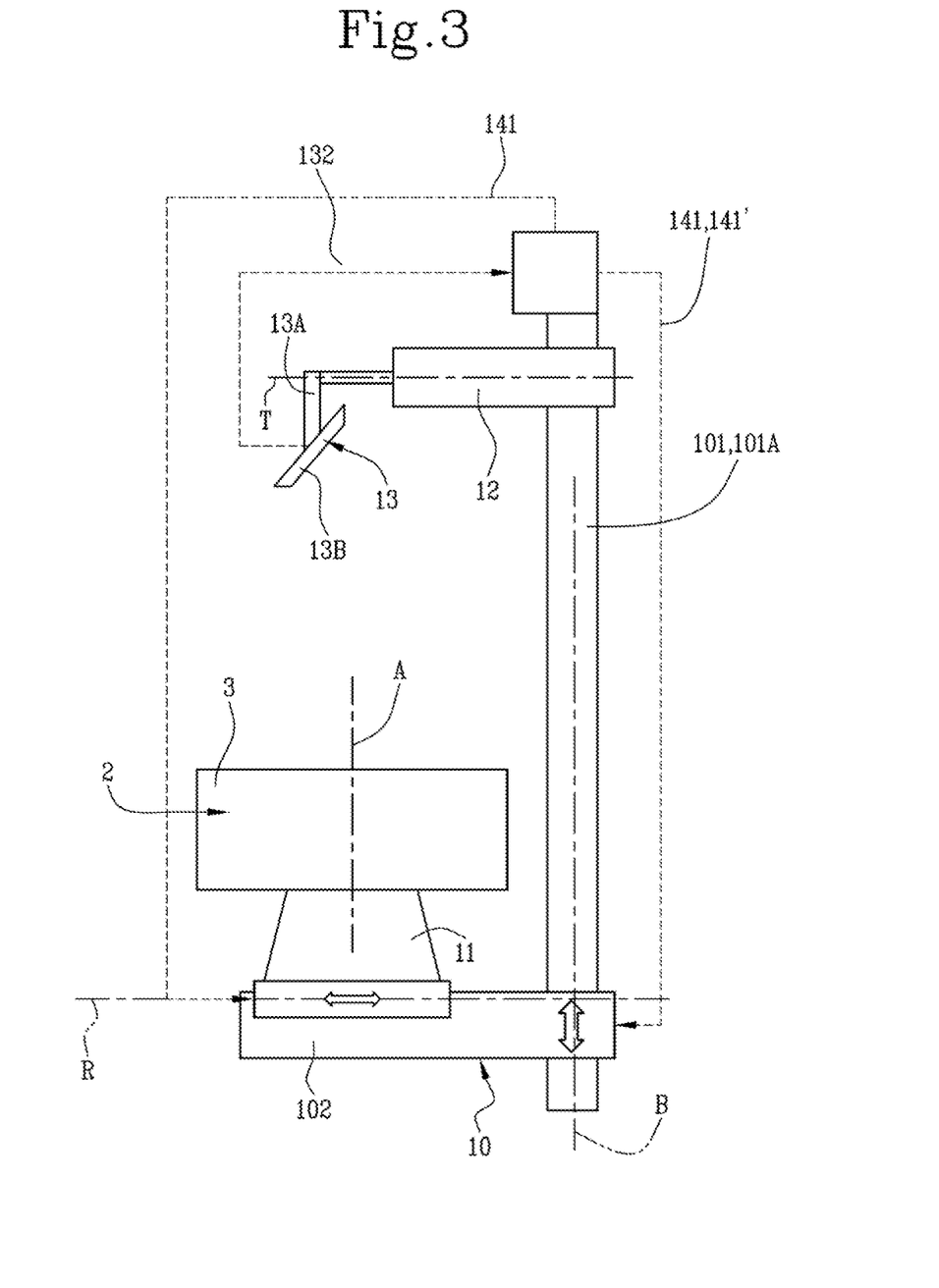
FIG. 3 schematically illustrates a further embodiment of an apparatus for demounting a tyre from a respective wheel rim.
Figure 4:
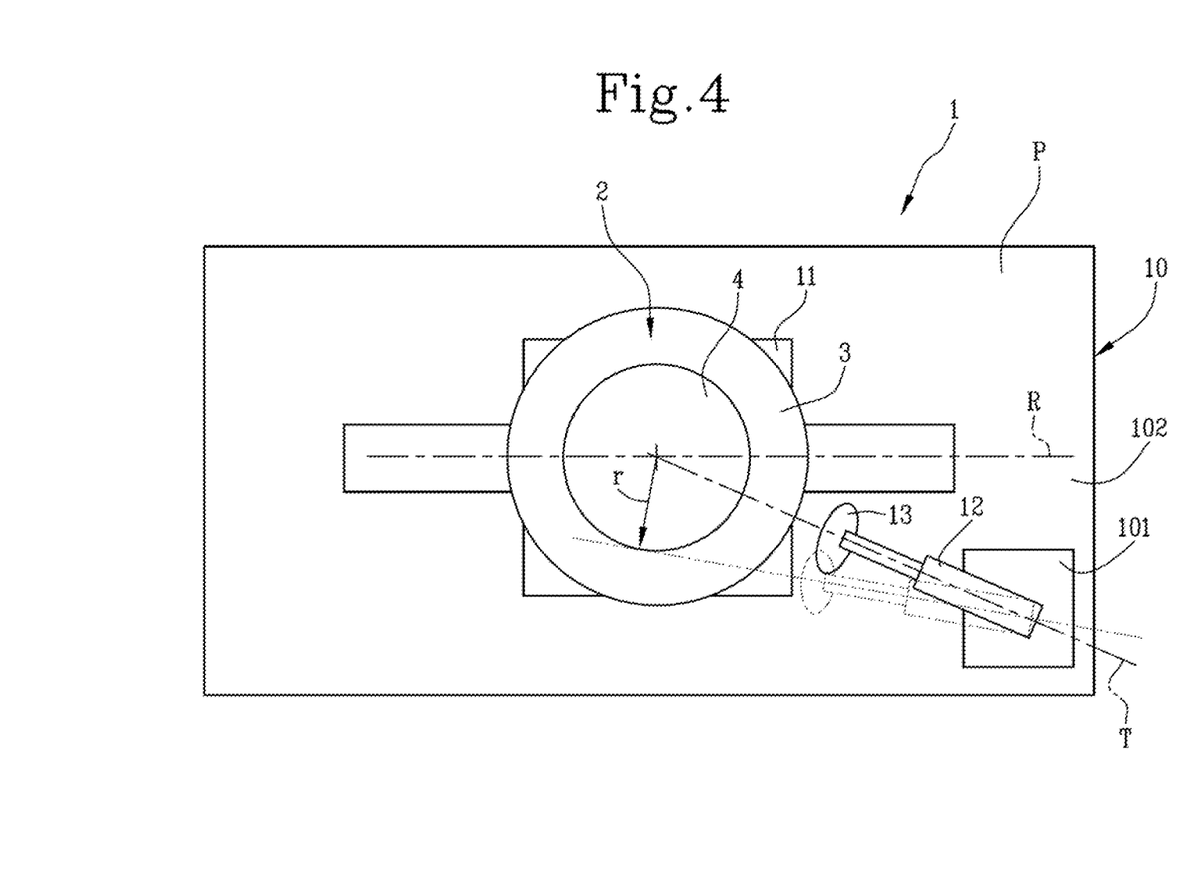
FIG. 4 is a schematic top view of the apparatus of FIG. 1.
Figure 5A:
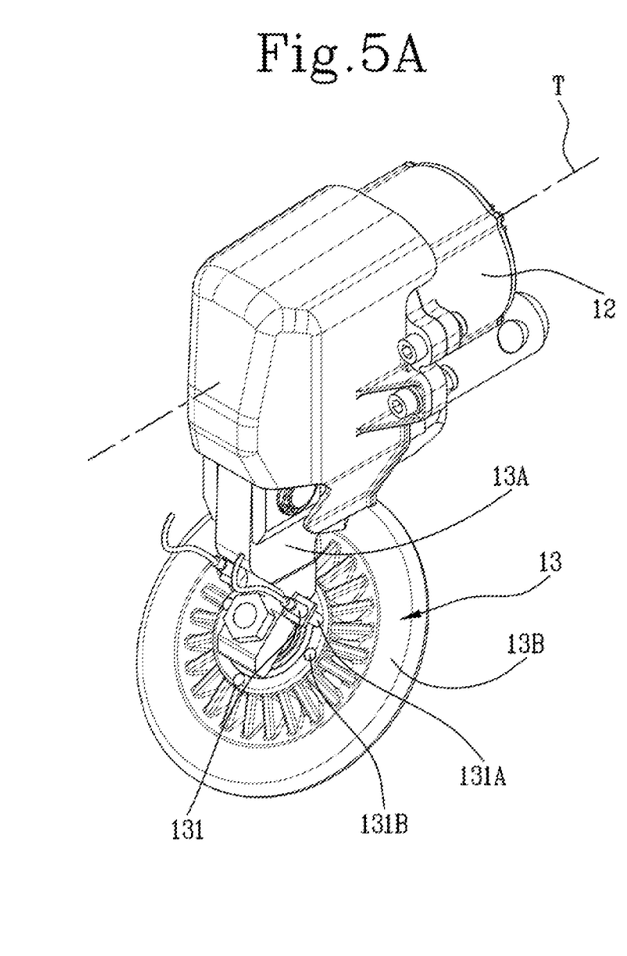
FIGS. 5A and 5B illustrate a detail of a bead breaker tool and of an additional bead breaker tool, respectively.

In an embodiment, the bead breaker tool 13 (the apparatus 1) comprises a sensor 131. The sensor 131 is configured to detect contact between the bead breaker tool 13 and the tyre 3 (or the wheel 2). In an embodiment, the sensor 131 is configured to detect relative rotation between the mounting element 13A and the bead breaker disc 13B.

The sensor 131 is configured to generate a contact signal 132 as a function of the relative rotation between the mounting element 13A and the bead breaker disc 13B.

In an embodiment, the sensor 131 is configured to detect a change in the electromagnetic field arising out of the relative rotation between the mounting element 13A and the bead breaker disc 13B.

In an embodiment, the sensor 131 comprises a first detecting element 131A and a second detecting element 131B.

The first detecting element 131A is connected to the mounting element 13A. The second detecting element 131B is connected to the bead breaker disc 13B.

The sensor 131 is configured to generate the contact signal 132 as a function of the relative motion between the first detecting element 131A and the second detecting element 131B.

In an embodiment, the sensor 131 is a proximity transducer. The sensor 131 (the first detecting element 131A) is capable of sensing and revealing the presence of an object (second detecting element 131B) within a certain field, in the proximity of the sensor itself, without actual physical contact, within a nominal detecting distance.

In an embodiment, the sensor 131 (the first detecting element 131A) detects only the presence or absence of an object (second detecting element 131B) when it is within the nominal detecting distance. In this embodiment, the contact signal 132 is an on/off (two-value, discrete two-value) signal in that it represents only absence/presence.

The circuit that generates the contact signal may be made according to different standards:
pure contact, like that which occurs at the terminals of a closed switch;
PNP type, where a voltage signal is generated which is capable of powering small loads;
NPN (or "open collector") type, where the output is connected to ground, making it possible to close an external circuit.

In an embodiment, the contact signal 132 is a low voltage, low-current signal (up to 48V and 200 mA) to power an input of the control unit 14.

In an embodiment, the sensor 131 is configured to measure a distance between the first detecting element 131A and the second detecting element 131B. In an embodiment, the sensor 131 produces a continuous contact signal as a function of the distance between the first detecting element 131A and the second detecting element 131B.

Described below by way of non-limiting example are some examples of sensors that can be used for the purposes of his invention.

In an embodiment, the sensor 131 may be of one of the types listed below:
magnetic sensor;
inductive sensor;
optical sensor;
capacitive sensor;
ultrasonic sensor.

The inductive sensor 131 uses the principle of electromagnetic field damping by induced currents (Foucault currents) in nearby conductive materials.

The capacitive sensor 131 uses the eddy current change created between the first detecting element 131A and the second detecting element 131B.

The ultrasonic sensor 131 uses high frequency sound pulse emission (40-200 kHz) to detect the presence of nearby objects thanks to the echo produced by the objects reflecting the ultrasounds.

Described below purely by way of non-limiting example is an embodiment of a magnetic sensor. The magnetic sensor comprises two reeds of ferromagnetic material (iron and nickel) inside a container containing inert gas. The two reeds are coated with a material which is configured to improve conductivity and to harden the surface, to prevent the formation of micro welds and micro pining at the point of contact. The two reeds are spaced from each other. The reeds are configured to bend under the action of a magnetic force which is greater than the elastic resistance of the reeds, thus making electrical contact.

In an embodiment, the sensor 131 is connected to the control unit 14. In an embodiment, the control unit 14 is configured to receive the contact signal 132.

In an embodiment, the control unit is configured to generate drive signals 141. In an embodiment, the drive signals 141 are a function of the contact signal 132. In an embodiment, the drive signals 141 comprise a stop signal 141'. The stop signal 141' is configured to stop the activation of the second actuator 5B. The stop signal 141' is a function of the contact signal 132. The drive signals 141 and/or the stop signals 141' are output signals from the control unit and input signals into respective actuators of the apparatus 1, which are controlled as a function of the drive signals 141 and/or stopped as a function of the stop signals 141'.

In an embodiment, the control unit 14 has access to a position signal. The position signal represents the position of the bead breaker tool 13 over time.

In an embodiment, the control unit 14 is configured to store the position signal at a given contact instant as a function of the contact signal 132 at the contact instant.

In an embodiment in which the contact signal 132 varies between two values (on/off), the control unit 14 is configured to store the position signal at the contact instant at which the contact signal 132 varies between the "off" value and the "on" value. In effect, it is at that instant that the first detecting element 131A is aligned with the second detecting element 131B, representing contact between the bead breaker disc and the wheel 2 which, as it rotates, entrains the bead breaker disc in rotation with it.

In an embodiment, the control unit 14 is configured to receive configuration data 142.

In an embodiment, the drive signals 141 are a function of the configuration data 142. The configuration data 142 can be entered manually by the user or captured automatically by the apparatus 1 through further sensors (for example, laser sensors or scanners).

In an embodiment, the configuration data 142 represent a diameter of the wheel 2.

In an embodiment, the apparatus 1 comprises an additional arm 12'. The additional arm 12' extends along the direction of activation T, included in an additional working plane P', perpendicular to the direction of movement B from a first end 12A' to a second end 12B'. The additional arm 12' is connected at its first end 12A' to the first structure 101. The additional working plane P' is disposed along the direction of movement B on an opposite side of the wheel 2 with respect to the working plane P.

In an embodiment, the additional arm 12' is movable in the direction of movement B. In an embodiment, the additional arm 12' is movable translationally in the direction of movement B. In an embodiment, the additional arm 12' is movable in the direction of activation T.

In an embodiment, the additional arm 12' may be driven by the second actuator 5B or by an additional actuator 5B'. The second actuator 5B is configured to move the additional arm 12' along the direction of movement B. In an embodiment, the additional actuator 5B' is configured to move the additional arm 12' along the direction of movement B.

In an embodiment, the apparatus 1 comprises an additional bead breaker tool 13'. The additional bead breaker tool 13' is connected to the additional arm 12'. The additional bead breaker tool 13' is connected to the second end 12B' of the additional arm 12'.

In an embodiment, the additional bead breaker tool 13' is movable along the direction of movement B. In an embodiment, the additional bead breaker tool 13' is movable translationally along the direction of movement B. In an embodiment, the additional bead breaker tool 13' is movable along the direction of activation T.

Figure 5B:
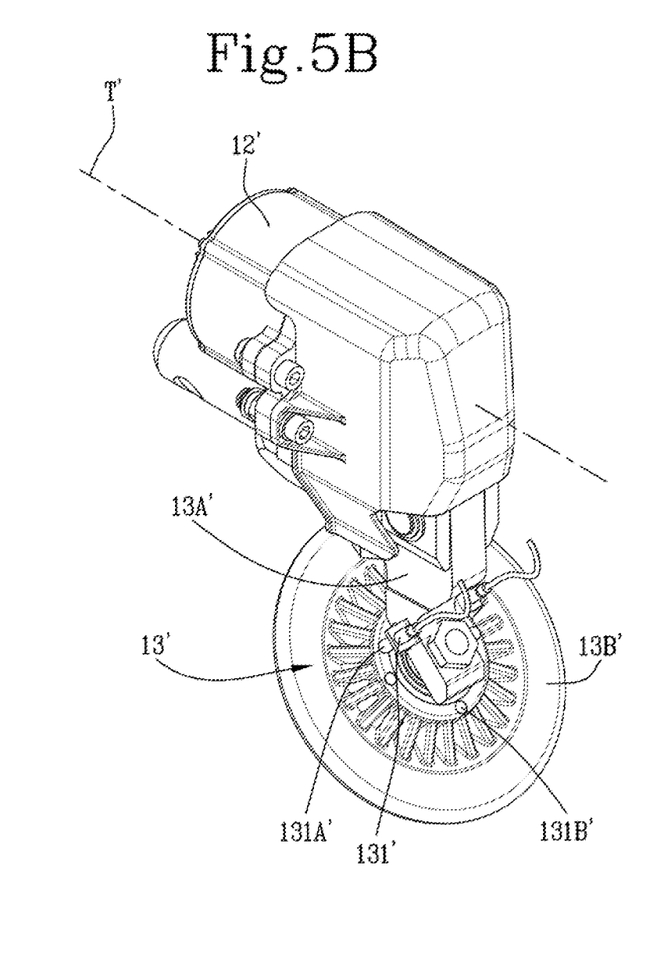
Figures 6A, 6B, 6C:
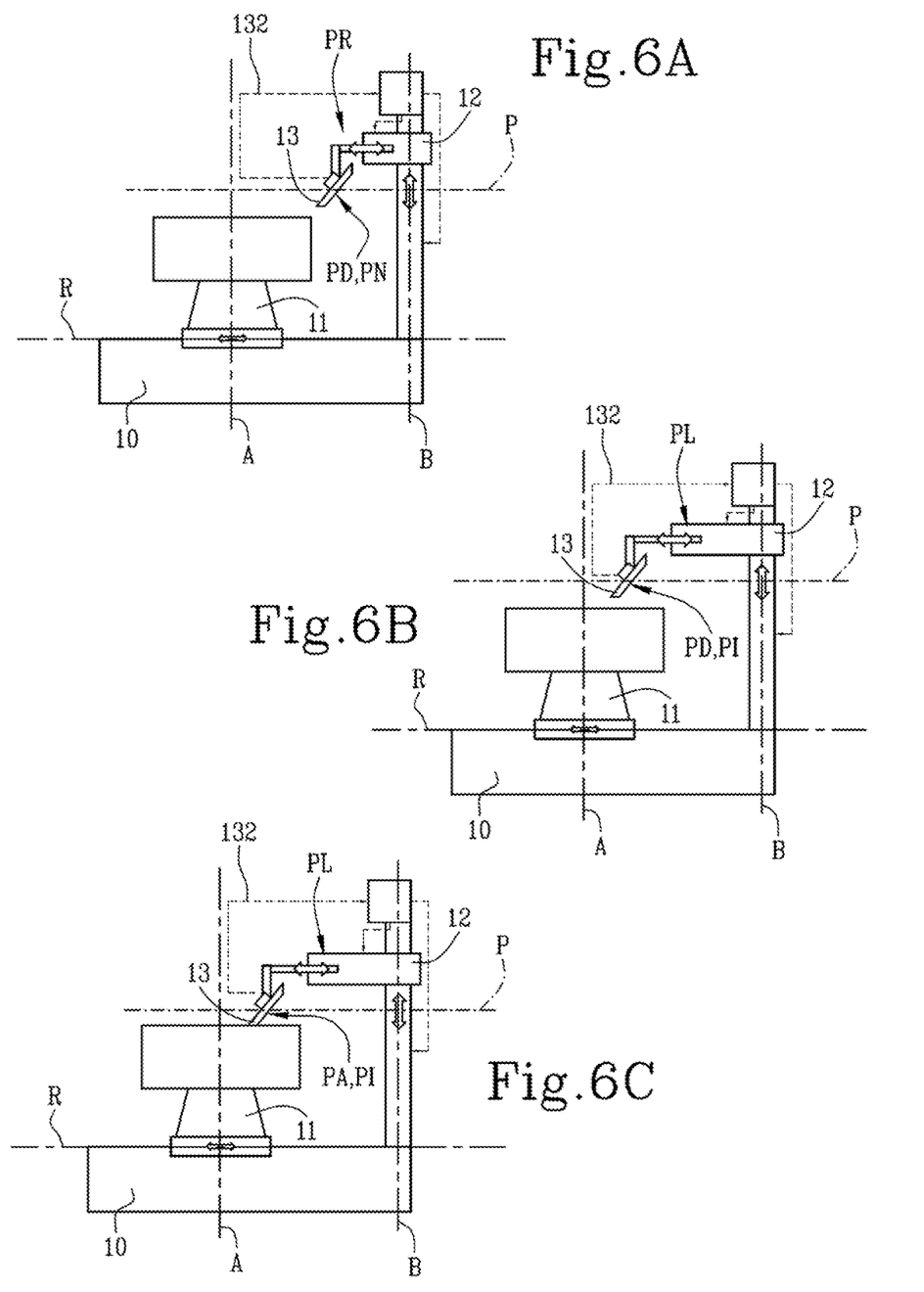
FIGS. 6A, 6B and 6C illustrate a first operating configuration, a second operating configuration and a third operating configuration of the apparatus of FIG. 1, respectively.

In an embodiment, the additional bead breaker tool 13' comprises a respective mounting element 13A'. In an embodiment, the additional bead breaker tool 13' comprises a bead breaker disc 13B'.

In an embodiment, the additional arm 12' is movable between a respective working position PL, where the additional bead breaker tool 13' is aligned with the wheel 2 along the direction of movement B, and a respective rest position PR, where the additional bead breaker tool 13' is out of alignment with the wheel 2 along the direction of movement B.

In an embodiment, the additional bead breaker tool 13' is movable between a respective interference position PI, where it is aligned with the wheel 2 along the direction of movement B, and a respective non-interference position PN, where it is out of alignment with the wheel 2 along the direction of movement B.

In an embodiment, the additional bead breaker tool 13' is movable between a respective activated position PA, where it is in contact with the tyre 3, and a respective deactivated position PD, where it is spaced from the tyre 3 along the direction of movement.

In an embodiment, the additional bead breaker tool 13' comprises a respective sensor 131'. The sensor 131' is configured to send a respective contact signal 132' to the control unit 14.

The control unit 14 is configured to generate (drive signals) stop signals 141' as a function of the contact signal 132' of the sensor 131' of the additional bead breaker tool 13'.

In an embodiment, the control unit 14 has access to an additional position signal, representing the position of the additional bead breaker tool 13' relative to the frame.

The control unit 14 is configured to store a value of the additional position signal as a function of the contact signal 132' received from the sensor 131' of the additional bead breaker tool 13'.

In an embodiment, the control unit 14 is configured to measure the size of the tyre 3 (the distance between the two sidewalls of the tyre 3) along the direction of movement B, as a function of the stored values of the position signal and additional position signal.

According to one aspect of it, this disclosure provides a method for demounting a tyre 3 from a respective rim 4 of a wheel 2.

The method comprises a step of supporting the wheel 2 on a supporting element 11. The method comprises a step of clamping the wheel 2 on the supporting element 11. The method comprises a step of rotating the supporting element 11 about an axis of rotation A. In the step of rotating, the wheel 2 is entrained in rotation by the rotation of the supporting element 11. In an embodiment, the method comprises a step of moving the supporting element 11. In the step of moving the supporting element 11, the supporting element 11 may be moved (preferably transitionally) along a direction of movement B parallel to the axis of rotation A and/or along a direction of adjustment R perpendicular to the direction of movement B.

In an embodiment, the method comprises a step of moving an arm 12 along the direction of movement B by means of an actuator 5B.

In an embodiment, the method comprises a step of moving a bead breaker tool 13 connected to the arm 12. In the step of moving, the bead breaker tool 13 moves between an activated position PA, where it is in contact with the tyre 3, and a deactivated position PD, where it is spaced from the tyre 3.

In an embodiment, the method comprises a step of activating the bead breaker too 13I. In the step of activating, the bead breaker tool 13 is moved in a working plane P perpendicular to the direction of movement B. In the step of activating, the bead breaker tool 13 is moved between an interference position PI, where the bead breaker tool 13 is aligned with the tyre 3 on the wheel 2 along the direction of movement B, and a non-interference position PN, where the bead breaker tool 13 is out of alignment with the tyre 3 on the wheel 2 along the direction of movement B.

In an embodiment, the method comprises a step of detecting a rotation. In the step of detecting a rotation, the relative rotation between a mounting element 13A and a bead breaker disc 13B of the bead breaker tool 13 is detected. The step of detecting the rotation is performed by a sensor 131.

In an embodiment, the method comprises a step of generating a contact signal 132. In an embodiment, the contact signal 132 represents relative rotation between the mounting element 13A and the bead breaker disc 13B of the bead breaker tool 13. In an embodiment, in the step of generating a contact signal 132, there is a change in the current flowing in the sensor 131.

In an embodiment, the method comprises a step of receiving the contact signal 132 in a control unit 14. In an embodiment, the control unit, being electronically connected to the sensor 131, receives the contact signal 132 from the sensor 131 continuously.

According to an aspect of this disclosure, the method comprises a step of generating stop signals 141'. The stop signals 141' are generated by the control unit 14. The stop signals are generated as a function of the contact signal 132.

In the step of generating the stop signals 141', the control unit 14 compares the value of the contact signal 132 received from the sensor 131 with a reference value. In the simplest example, the control unit 14 compares the value of the contact signal 132 with the zero value and generates the stop signal 141' if the value of the contact signal 132 is different from the zero value.

In an embodiment, the method comprises a step of stopping. In the step of stopping, the step of moving the bead breaker tool 13 is stopped as a function of the stop signals 141'.

In an embodiment, the method comprises a step of accessing a position signal. The position signal represents a position of the bead breaker tool, preferably along the direction of movement B. In the step of accessing the position signal, the control unit knows the position of the bead breaker tool 13 at any instant in time. For example, in the step of accessing, the control unit 14 receives a continuous position signal correlated, according to a predetermined relation, with the position of the bead breaker tool 13 relative to the frame. For example, the control unit might receive a value of the position of a second actuator 5B as a function of which it calculates the position of the bead breaker tool 13.

In an embodiment, the method comprises a step of storing a value of the position signal. In an embodiment, the step of storing a value of the position signal is performed as a function of the contact signal 132 received from the sensor 131.

In an embodiment, in the step of storing, the control unit 14 compares the value of the contact signal 132 with a reference value—for example, the zero value—and, as a function of the comparison, stores the value of the position signal at the same time instant.

In an embodiment, the control unit 14 stores the value of the position signal corresponding to the instant when the control unit 14 generates the stop signal 141'.

In an embodiment, the method comprises a step of entering data. In the step of entering data, the control unit 14 receives configuration data 142 representing a diameter of the wheel 2 (or other geometric features of the wheel 2). In the step of entering data, a user enters the configuration data in a user interface 14'. In an embodiment, the control unit 14 receives the configuration data 142 from further sensors of the apparatus 1.

In an embodiment, the method comprises a step of accessing an additional position signal. The additional position signal represents a position of an additional bead breaker tool 13' along the direction of movement B. The additional bead breaker tool 13' is disposed along the direction of movement B, on an opposite side of the wheel 2 with respect to the bead breaker tool 13.

In an embodiment, the method comprises a step of storing a value of the additional position signal. In an embodiment, the step of storing a value of the additional position signal is performed as a function of a respective contact signal 132' received from a respective sensor 131' of the additional bead breaker tool 13'.

In an embodiment, the method comprises a step of calculating the distance along the direction of movement B between the two sidewalls of the tyre 3, as a function of the value of the position signal and the value of the additional position signal.

In an embodiment, the method comprises a step of moving the supporting element 11.

In an embodiment, the method comprises both the step of moving the supporting element 11 and the step of moving the bead breaker tool 13 and/or the additional bead breaker tool 13'. In this embodiment, the method comprises a step of synchronizing, in which the movement of the supporting element and the movement of the bead breaker tool are synchronized by a synchronizing system. For example, the step of synchronizing might be performed using a plurality of cams, designed to convert the motion of the supporting element 11 into a specific movement of the bead breaker tool 13 and/or of the additional bead breaker tool 13'.

In an embodiment, the step of detecting the rotation is carried out by measuring a change in the electromagnetic field with a magnetic sensor.

In an embodiment, the step of detecting the rotation is carried out by measuring induction with an induction sensor. In an embodiment, the step of detecting the rotation is carried out by optical measurement or by ultrasonic measurement.

The invention claimed is:

1. An apparatus for changing a tyre from a corresponding rim of a wheel, comprising:
   a frame;
   a supporting element, rotatable about an axis of rotation and configured to support the wheel rotatably about the axis of rotation;
   an arm, movable relative to the supporting element to allow the arm and the supporting element to be moved relative to each other by an actuator along a direction of movement parallel to the axis of rotation;
   a bead breaker tool connected to the arm to move between an activated position, where the bead breaker tool is in contact with the tyre, and a deactivated position, where the bead breaker tool is spaced from the tyre, wherein the bead breaker tool includes a mounting element and a bead breaker disc, which can rotate freely about a disc rotation axis relative to the mounting element, the bead breaker tool including a sensor, configured to generate a contact signal indicating contact between the bead breaker tool and a sidewall of the tyre based upon the sensor detecting a relative rotation between the bead breaker disc and the mounting element, wherein the contact signal varies between an "off" value and an "on" value,
   wherein the mounting element has a first end connected to the arm and a second end connected to the bead breaker disc, the sensor being positioned at the second end of the mounting element for sensing the rotation of the breaker disc about the disc rotation axis relative to the mounting element; and
   a control unit connected to the actuator for driving the actuator and connected to the sensor to receive the contact signal, wherein the control unit, responsive to the contact signal switching from the "off" value to the "on" value, derives that the bead breaker tool is in the activated position, generates a stop signal to stop the actuator, and stores position data about a position of the arm.

2. The apparatus according to claim 1, wherein the control unit is connected to the actuator to drive it and is configured to generate stop signals as a function of the contact signal received from the sensor in order to stop the actuator.

3. The apparatus according to claim 1, wherein the control unit has access to a position signal, representing a position of the bead breaker tool along the direction of movement and is configured to store a value of the position signal as a function of the value of the additional contact signal.

4. The apparatus according to claim 1, wherein the bead breaker tool is movable in a working plane, perpendicular to the direction of movement, between an interference position, where the bead breaker tool is aligned with the tyre on the wheel along the direction of movement, and a non-interference position, where the bead breaker tool is out of alignment with the tyre on the wheel along the direction of movement.

5. The apparatus according to claim 1, wherein the actuator is configured to drive the bead breaker tool in a working plane, wherein the control unit is configured to receive configuration data representing a diameter of the wheel and to generate drive signals as a function of which the bead breaker tool is moved to the interference position.

6. The apparatus according to claim 1, wherein the bead breaker tool is movable in a working plane along a direction of activation incident upon the axis of rotation of the supporting element.

7. The apparatus according to claim 1, wherein the sensor is a sensor of one of the following types:
   magnetic sensor;
   induction sensor;
   capacitive sensor;
   ultrasonic sensor;
   optical sensor.

8. The apparatus according to claim 1, wherein the actuator is a hydraulic cylinder.

9. The apparatus according to claim 1, wherein the supporting element is movable relative to the frame translationally along a direction of adjustment.

10. The apparatus according to claim 1, comprising an additional arm and an additional bead breaker tool, disposed along the direction of movement on a side of the wheel opposite to that where the bead breaker tool is disposed, wherein the additional bead breaker tool comprises a respective sensor, a respective mounting element and a respective bead breaker disc and wherein the additional bead breaker tool is configured to generate a respective contact signal representing a relative rotation between the respective mounting element and the respective bead breaker disc, wherein the control unit is connected to the sensor of the additional bead breaker tool to receive the respective contact signal.

11. The apparatus according to claim 1, wherein the disc rotation axis is inclined at an angle to the axis of rotation.

12. The apparatus according to claim 1, wherein the sensor comprises a first detecting element, connected to the mounting element, and a second detecting element, connected to the bead breaker disc, and wherein the sensor is configured to generate the contact signal as a function of the relative motion between the first detecting element and the second detecting element.

13. The apparatus according to claim 1, wherein the sensor is configured to detect a change in the electromagnetic field arising out of the relative rotation between the mounting element and the bead breaker disc.

14. A bead breaker tool in an apparatus for demounting a tyre from a corresponding rim of a wheel, comprising:
   a mounting element;
   a bead breaker disc, freely rotatable relative to the mounting element about a disc rotation axis;
   a sensor, configured to generate a contact signal indicating contact between the bead breaker tool and a side wall of the tyre based upon the sensor detecting a relative rotation between the bead breaker disc and the mounting element, wherein the contact signal varies between an "off" value and an "on" value;
   wherein the mounting element has a first end connectable to an arm of the apparatus and a second end connected to the bead breaker disc, the sensor being positioned at the second end of the mounting element for sensing the rotation of the breaker disc about the disc rotation axis relative to the mounting element;
   wherein the bead breaker tool further comprises a control unit connected to an actuator for driving the actuator and connected to the sensor to receive the contact signal, wherein the control unit, responsive to receiving the contact signal, derives that the bead breaker tool is in the activated position, generates a stop signal to stop the actuator, and stores position data about a position of the arm.

15. A method for demounting a tyre from a respective rim of a wheel, comprising the following steps:
   supporting the wheel on a supporting element;
   rotating the supporting element about an axis of rotation;
   moving an arm relative to the supporting element along a direction of movement parallel to the axis of rotation by means of an actuator;
   moving a bead breaker tool, connected to the arm, relative to the supporting element, between an activated position, where it is in contact with the tyre, and a deactivated position, where it is spaced from the tyre, wherein the bead breaker tool includes a mounting element and a bead breaker disc which can rotate freely relative to the mounting element about a disc rotation axis, the mounting element having a first end connected to the arm and a second end connected to the bead breaker disc;
   generating a contact signal indicating contact between the bead breaker tool and a sidewall of the tyre based upon a sensor detecting a rotation of the breaker disc about the disc rotation axis relative to the mounting element, wherein the contact signal varies between an "off" value and an "on" value;
   receiving the contact signal in a control unit;
   by the control unit, deriving that the bead breaker tool is in the activated position responsive to the contact signal switching from the "off" value to the "on" value, generating a stop signal to stop the actuator and storing position data about a position of the arm.

16. The method according to claim 15, comprising a step of generating stop signals, generated by the control unit as a function of the contact signal and a step of stopping, wherein the step of moving the bead breaker tool is stopped as a function of the stop signals.

17. The method according to claim 15, comprising the following steps:
   accessing a position signal representing a position of the bead breaker tool along the direction of movement;
   storing a value of the position signal as a function of the contact signal received from the sensor.

18. The method according to claim 17, comprising the following steps:
   accessing an additional position signal representing a position of an additional bead breaker tool along the direction of movement; the additional bead breaker tool being disposed along the direction of movement, on an opposite side of the wheel with respect to the bead breaker tool;
   storing a value of the additional position signal as a function of a respective contact signal received from a respective sensor of the additional bead breaker tool;
   calculating a distance along the direction of movement between the two sidewalls of the tyre, as a function of the value of the position signal and the value of the additional position signal.

* * * * *